Feb. 6, 1968 G. P. DUECY 3,367,636
CEMENT TRANSPORTING AND PLACING MACHINE
Filed March 29, 1967 7 Sheets-Sheet 1
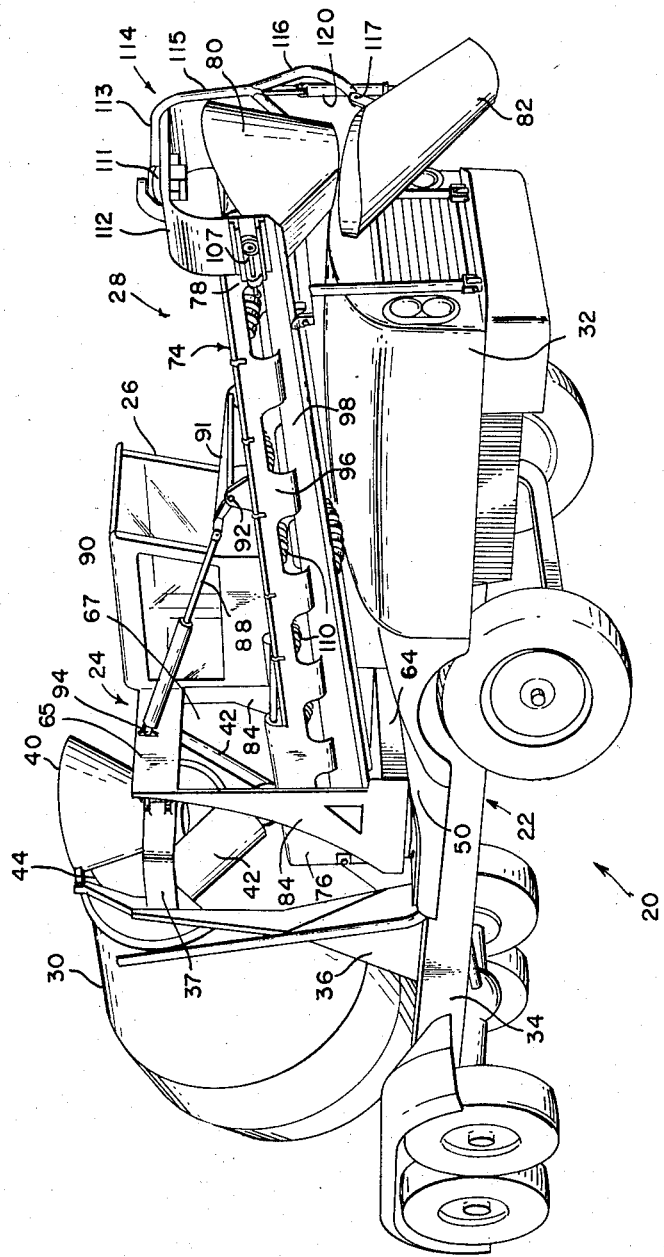
FIG__1
GEORGE P. DUECY
INVENTOR.
BY Shaybeal, Cole & Barnard
ATTORNEYS

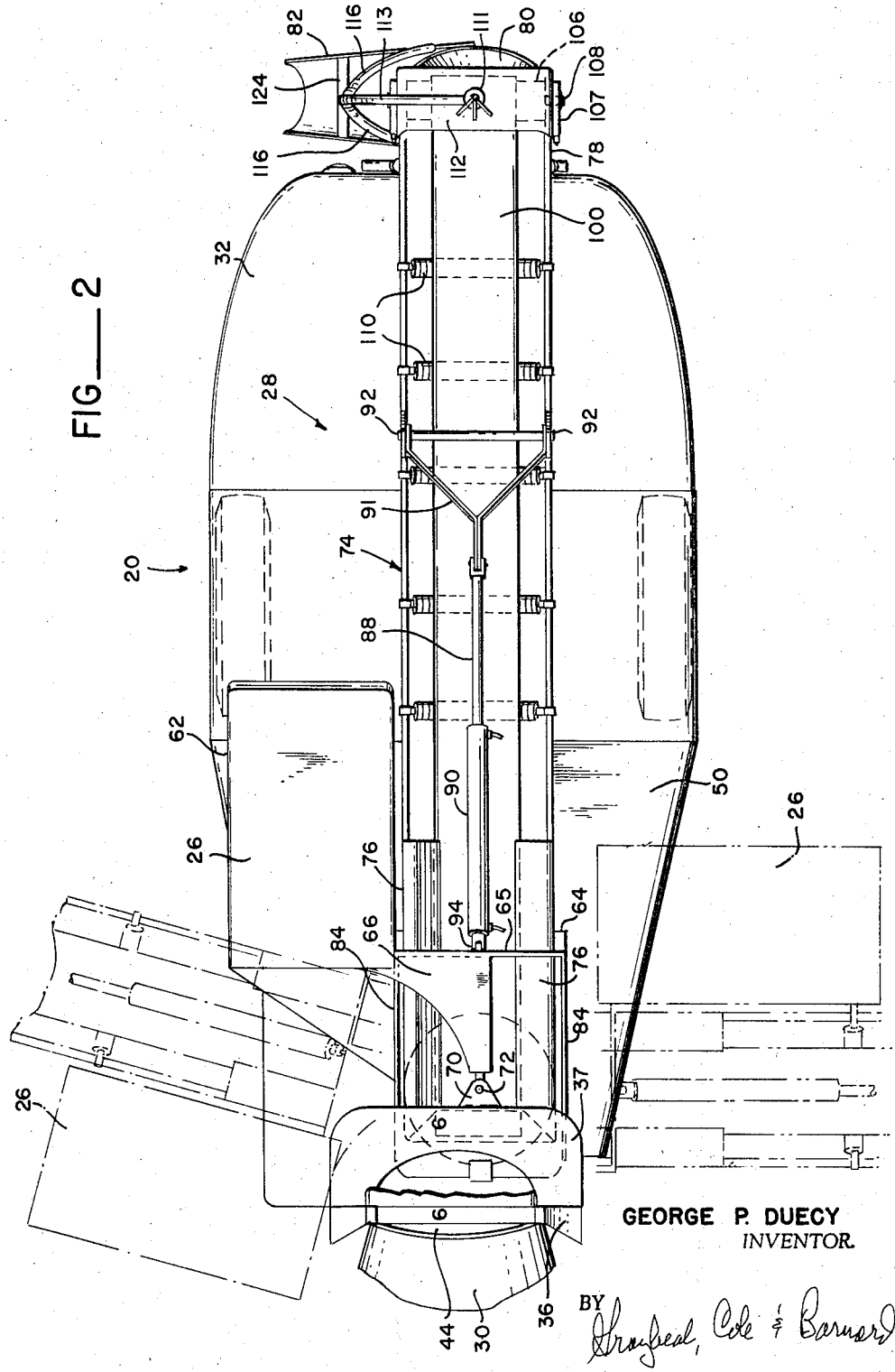

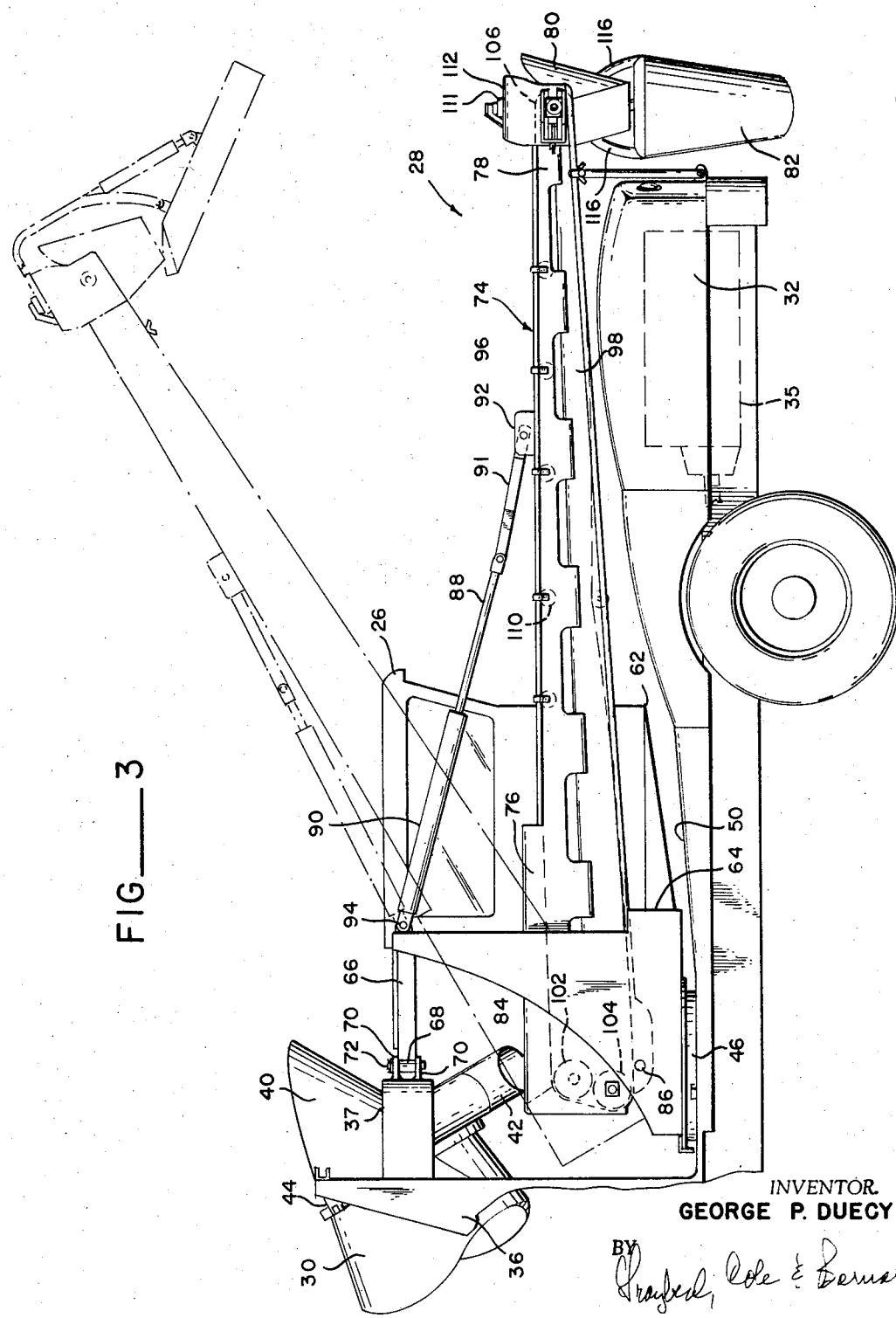

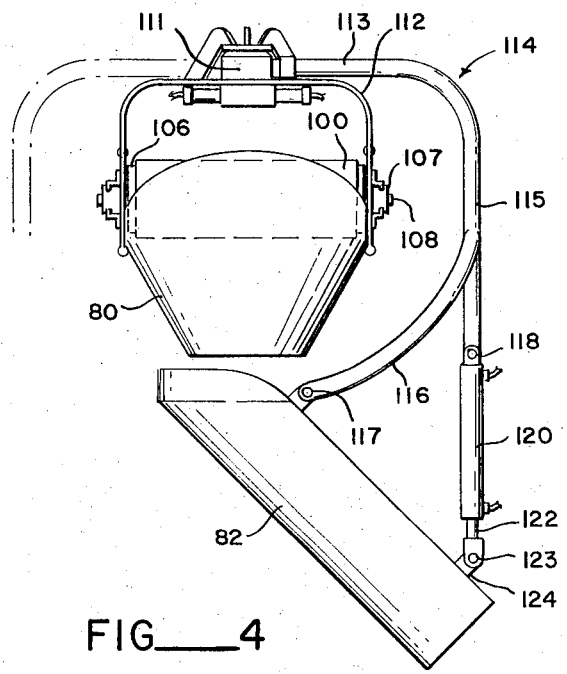
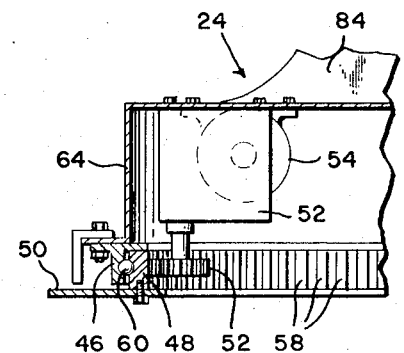
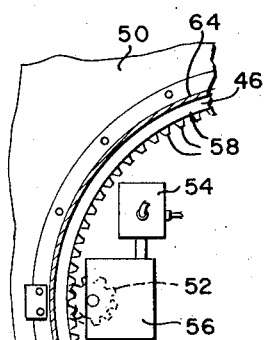
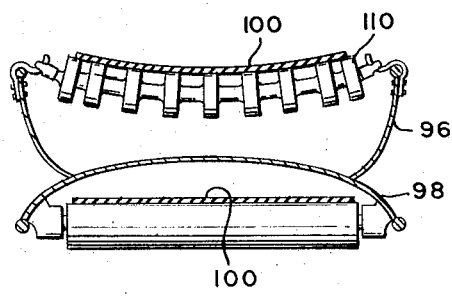
FIG__4
FIG__6
FIG__5
FIG__7
GEORGE P. DUECY
*INVENTOR*
BY
*ATTORNEYS*

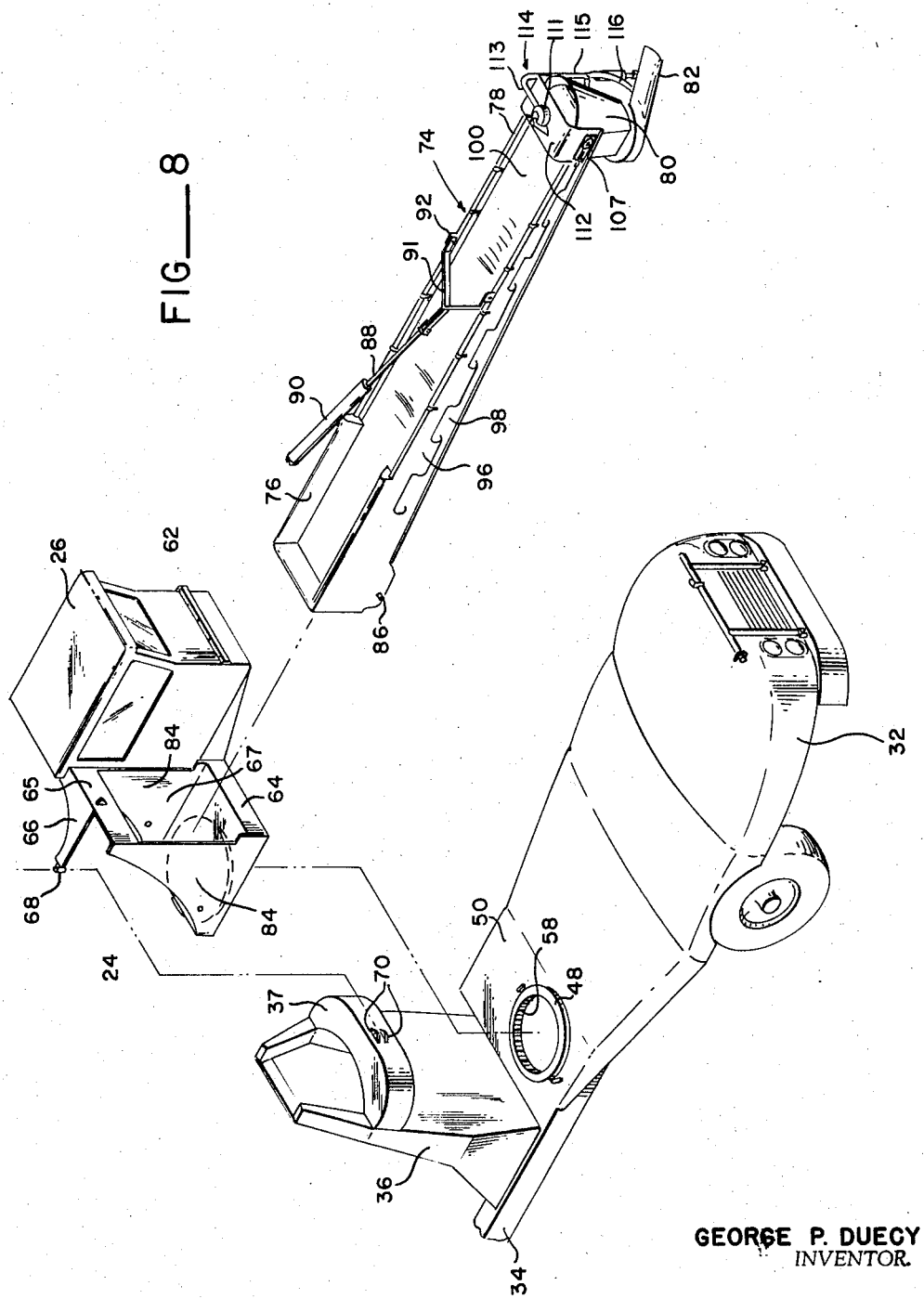

Feb. 6, 1968  G. P. DUECY  3,367,636
CEMENT TRANSPORTING AND PLACING MACHINE
Filed March 29, 1967  7 Sheets-Sheet 6
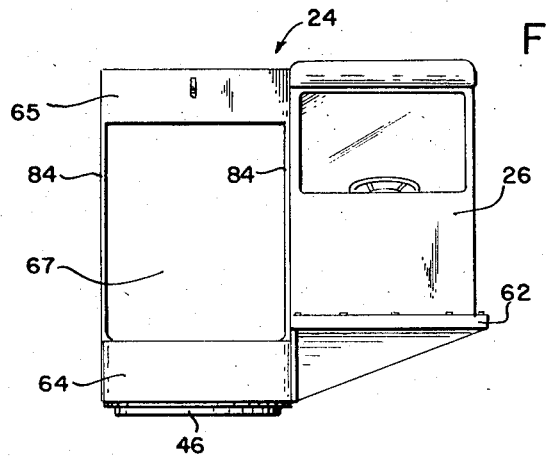
FIG__9
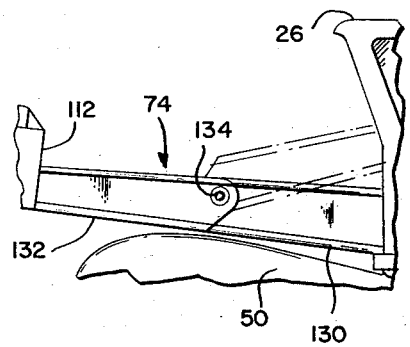
FIG__12
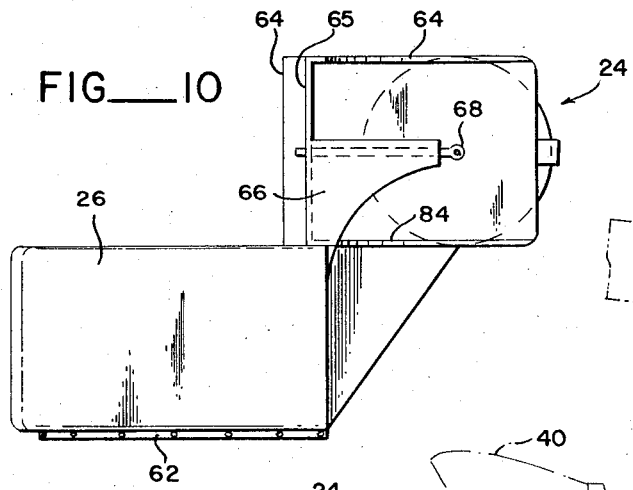
FIG__10
FIG__13
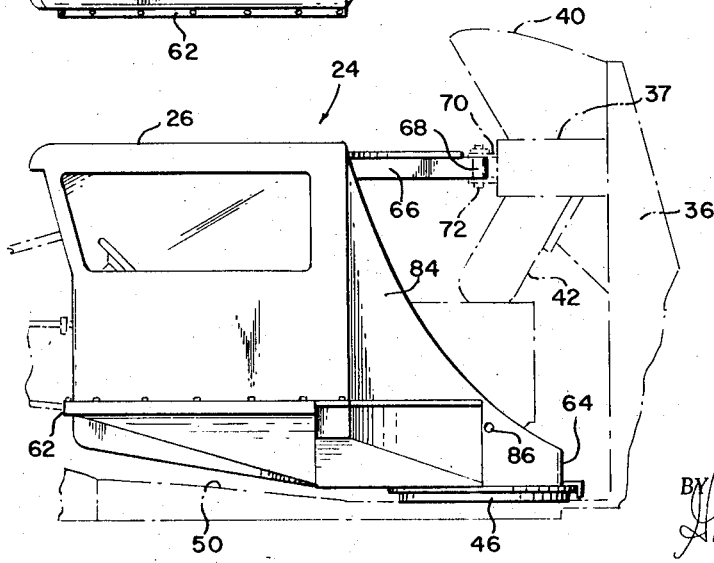
FIG__11
GEORGE P. DUECY
INVENTOR.
BY Graybeal, Cole & Barnard
ATTORNEYS Feb. 6, 1968   G. P. DUECY   3,367,636
CEMENT TRANSPORTING AND PLACING MACHINE
Filed March 29, 1967   7 Sheets-Sheet 7
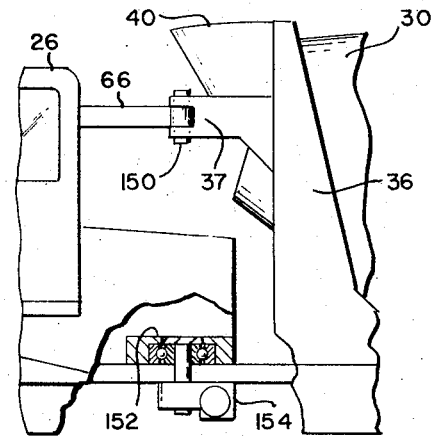
FIG___15
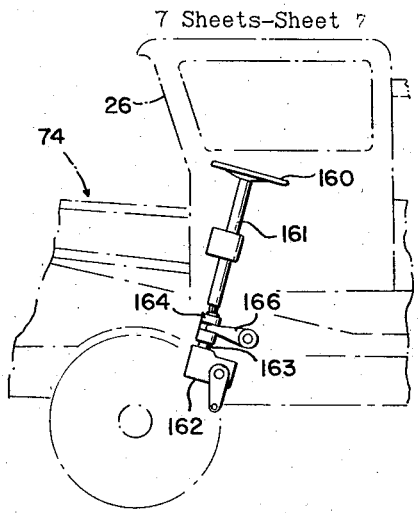
FIG___14
FIG___16   FIG___17
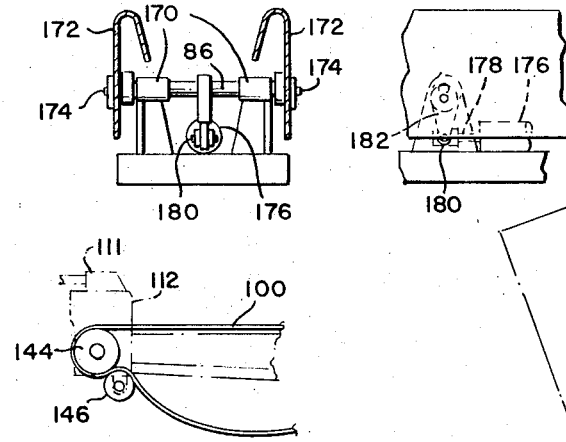
FIG___18
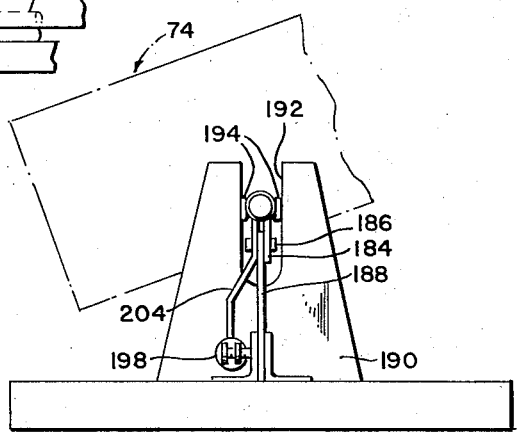
FIG___20
FIG___19
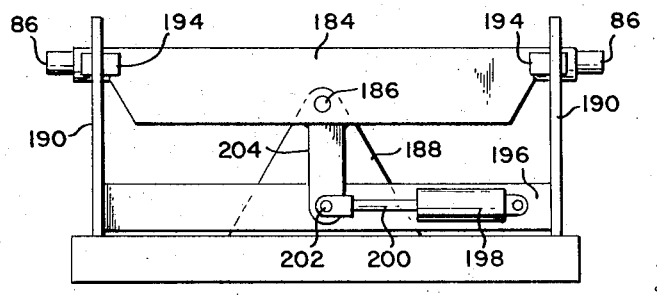
GEORGE P. DUECY
INVENTOR.
BY
Graybeal, Cole & Barnard
ATTORNEYS

3,367,636
CEMENT TRANSPORTING AND PLACING MACHINE
George P. Duecy, Everett, Wash. 98201
Filed Mar. 29, 1967, Ser. No. 626,842
25 Claims. (Cl. 259—169)

ABSTRACT OF THE DISCLOSURE

A concrete transporting, elevating and placing machine having mixer means for discharging concrete on to a continuous conveyor for accurate placement of the concrete. The conveyor is supported by a conveyor boom frame which rotates about a horizontal axis generally from side to side of the machine and at the same time pivots about a horizontal axis for raising and lowering the outer end of the boom frame. An operator's cab or control housing is attached to the boom frame structure for rotational side to side movement with the boom frame. The outer end of the boom frame has appropriate chute means for accurate placement of the concrete falling off the end of the continuous conveyor.

Background of the invention

The present invention relates to the art of transporting, elevating and placing concrete. More specifically, this invention provides an improved concrete transporting, elevating and placing vehicle wherein the concrete placing apparatus and the control housing or cab are connected for concurrent rotational movement relative to the vehicle chassis. This arrangement affords the operator a maximum field of vision while driving or operating, regardless of the angular position of the concrete placing apparatus.

The concrete transporting and placing vehicle shown in U.S. Patent No. 3,185,450 utilizes a rotatably mounted conveyor to transfer the concrete from the mixer unit to the point of use. This machine has proven to be highly efficient for delivering and placing a homogeneous mixture of low slump concrete at various building sites. Although not shown in the patent, all of the controls for this machine are manipulated from the operator's position which is fixedly mounted on the vehicle chassis along one side of the mixer unit. The operator's position is elevated to afford the operator a maximum field of vision for driving the vehicle and for placing concrete, but his field of vision is necessarily more limited when the conveyor boom is rotated or swung to the far side of the chassis than when it is extending over the front or near side of the chassis.

United States Patent No. 2,859,949 shows a forward discharging vehicle in which the receiving and discharging end of the mixer is located above the cab to discharge into a chute which is located forwardly of the cab. The chute itself is not controllable except by movement of the vehicle chassis itself or by some one outside the vehicle swinging the chute around its pivot. The incline on the chute is not favorable to the placement of low slump concrete.

United States Patent No. 3,019,002 is also a forwardly discharging vehicle of much the same type as that shown in U.S. Patent No. 2,859,949. Again, the receiving and discharging end of the mixer is located above and slightly forward of the operator's cab. The mixer discharges into a chute means which permits him to observe the placement of the concrete.

The mixing of the correct portions of cement, sand and gravel, and water, are a relatively simple process to the knowledgeable constructor. The merit and economic vantage in purchasing concrete pre-mixed and delivered for use in construction of a concrete structure of any type arise from the ability of the pre-mixed concrete manufacturer to perform services better, and at a lower cost, than the builder can perform them himself. The services performed by pre-mixed concrete manufacturers are the purchase and assembly of the concrete material at a loading point where these materials are measured loaded into a delivery vehicle. In some situations the concrete materials are mixed and the resulting concrete is loaded into the delivery vehicle. In other situations the delivery vehicle has incorporated into it the concrete mixer. In both cases the resulting concrete mixture is delivered to the point of use by the delivery vehicle.

The specific desirable features required in the manufacture and delivery of pre-mixed concrete are: quality of product, and ability to deliver the concrete to its point of use in the most desirable condition with the resulting lowest cost and least amount of effort.

Concrete quality is affected by many conditions. High among the considerations of concrete quality is the production of a homogenous mixture of material that can be placed in a workable mixture with the lowest slump. Slump is the common measure of the workability of concrete, and the most desirable concrete is obtained by use of the least amount of added water in the concrete mixture. A low slump will ordinarily produce high strength concrete having minimum shrinkage. As the slump increases the shrinkage of the concrete increases and the strength decreases. The lower the slump in concrete, the more difficult it is to transport and place. However, if quality concrete is to be achieved, the slump of the concrete must be controlled to the lowest level that can be properly placed. The use of chutes to place concrete requires a high slump mixture with excess water. The longer and flatter the chutes, the greater the amount of undesirable excess water in the mixture and the greater the amount of resulting segregation of the sloppy mixture as it flows down the chute to its point of use. The high slump and segregation of the resulting concrete at its point of use are two of the most undesirable deficiences of concrete. The results are a nonhomogenous, weak concrete that shrinks and cracks excessively.

During the last twenty-five years the development of delivery vehicles for the transportation of concrete mixtures has progressed from small, often makeshift, trucks, to the present large capacity, special trucks of today. The present-day trucks are usually standard chassis upon which concrete mixers, agitators, or dump trucks have been mounted. These vehicles have, in general, a common feature in that the concrete is usually dumped into a chute and the chute is used to transport the concrete either to the point of use or into a means, buggy, bucket, conveyor, pump, etc. of transporting the concrete to its point of use.

Directing concrete into the chute from the mixer, agitator, or dump unit, as the case may be, is controlled by either the rotation of the mixer or agitator to the discharge direction, elevating the dump unit, regulating a gate, or a combination of part or all of these means to control flow of the mixture. These common, conventional units are unloaded from the back of the truck and the act of unloading is usually controlled from that point. The discharge position of the chute is limited due to conventional mixer truck design and the use of chutes to unload the vehicle. This action of unloading requires that the vehicle operator leave the operating cab of the unit to perform the act of unloading the vehicle, or, that this action be performed by the assistance of one or more other persons. Chute extensions, longer than a few feet, are manually added to the chute attached to the delivery vehicle. Chute elevation and direction are often controlled by the power methods since they can be heavy and cumbersome. The size of the vehicle and its physical dimensions limit the use of the chutes and the consideration of concrete quality prevents the use of chutes that will transport the concrete beyond a few feet from the concrete delivery unit. Occasionally job site realities comprise the requirements of quality concrete and long chutes of flat slope into which high slump concrete is discharged which have to be undertaken. The result is low strength, segregated concrete with excessive shrinkage.

It is a feature of the present invention to provide an improved concrete transporting, elevating and placing machine of the type discussed above, wherein the control cab is situated to afford the operator maximum field of vision regardless of the angular disposition of the concrete conveyor.

Another feature of this invention is to provide an improved concrete transporting, elevating and placing machine of the type discussed above, wherein the control cab and the concrete conveyor are connected for concurrent rotational movement relative to the vehicle chassis.

It is another feature of this inventin to supply a concrete transporting, elevating and placing machine wherein the operator has control not only of the concrete placing element of the vehicle but also has control of the vehicle itself even though the cab or control housing has rotated with the conveyor frame.

Still another feature of this invention is to furnish a concrete transporting, elevating and placing machine wherein the operator has visual control of the concrete at all times from the moment it leaves the mixer until it has been poured into position.

Yet another feature of this invention is to provide a concrete transporting, elevating and placing machine in which the operator in observing the concrete discharging from the mixer can control slump and workability of the concrete before it leaves the mixer.

A further feature of this invention is to supply a concrete transporting, elevating and placing machine wherein the operator by visual observation of all points in the conveying system can control rate of delivery as well as accurately and precisely place the concrete.

A still further feature of this invention is to provide a machine wherein the concrete mixture regardless of slump can be elevated to and poured at a point above the mixer discharge opening.

Briefly, the foregoing objects have been realized by providing a concrete transporting, elevating and placing vehicle which comprises a mobile chassis; a turntable mounted on the chassis for rotational movement relative thereto about a substantially vertical axis; a generally elongated belt-type conveyor structure mounted on the turntable for concurrent rotational movement therewith; and a control housing or cab mounted on the turntable for concurrent rotational movement with the turntable and the conveyor. In the embodiment illustrated herein, the conveyor is mounted for pivotal movement relative to the turntable about a substantially horizontal axis, thereby permitting the outer or discharge end of the conveyor to be selectively raised and lowered. A suitable guide hopper and discharge chute are provided on the outer or discharge end of the conveyor for facilitating placement of the concrete. A concrete mixing unit is mounted on the rear portion of the chassis and is adapted to deliver concrete to the inner or receiving end of the conveyor.

The foregoing and other objects, features and advantages of the invention will be apparent from the following more detailed description of a preferred embodiment of the invention, as illustrated in the accompanying drawings.

*Description of the drawings*

FIGURE 1 is a perspective view of the concrete transporting, elevating and placing vehicle constructed in accordance with the teachings of the present invention;

FIGURE 2 is a top plan view of the front portion of the vehicle shown in FIGURE 1, and illustrates, in phantom lines, the ability of the conveyor and the control cab to swing or rotate to either side of the vehicle chassis;

FIGURE 3 is a side elevation view of the front portion of the vehicle of FIGURES 1 and 2 with the conveyor being shown in phantom lines in its raised position;

FIGURE 4 is a front elevation view of the guide hopper and discharge chute assembly mounted on the outer or discharge end of the conveyor;

FIGURE 5 is a vertical cross-sectional view of the conveyor showing some of the details of the belt, rollers and frame structure thereof;

FIGURE 6 is a fragmentary elevation view, partly in section, showing some of the details of the bearing ring structure employed to rotatably mount the turntable on the vehicle chassis;

FIGURE 7 is a fragmentary top plan view, partly in section, of the bearing ring structure illustrated in FIGURE 6;

FIGURE 8 is an exploded perspective view of the front portion of the vehicle shown in FIGURES 1 to 3 illustrating the manner in which the vehicle chassis, turntable, control cab and conveyor are operatively associated;

FIGURES 9, 10 and 11 are front elevation, top plan and side elevation views, respectively, of the turntable and control cab structure, with the portions of the vehicle chassis to which the turntable is connected being shown in phantom lines in FIGURE 11;

FIGURE 12 is a partial side elevational view of the boom frame indicating that a boom may be so constructed as to have the forward portion thereof fold back over the rear portion when it is not in use;

FIGURE 13 is a partial side elevational view of the boom structure generally showing that the boom may also be extendable and retractable for additional flexibility and accuracy in placing concrete;

FIGURE 14 is a partial side elevational view showing a quick mechanical disconnect linkage mechanism for the steering gear in the operator's cab so that when the vehicle is on public roads mechanical steering may be resorted to rather than hydraulic steering of the vehicle chassis;

FIGURE 15 is a partial side elevational view showing an alternative turntable mechanism for the conveyor frame and cab structure;

FIGURES 16 and 17 show partial elevational views of a boom or conveyor leveling mechanism;

FIGURE 18 shows a conveyor belt slack thrower which may be used with the machine; and FIGURES 19 and 20 are partial elevational views showing an alternative boom leveling structure.

Description of preferred embodiment

Referring now to the drawings, in which like numerals designate like parts, a concrete transporting and placing vehicle 20 is seen to comprise a mobile chassis 22, a turntable structure 24 rotatably mounted on the chassis 22, a control housing or cab 26 fixedly mounted on the turntable structure 24, a concrete placing apparatus or conveyor structure 28 pivotally mounted on the turntable structure 24, and a concrete mixer unit 30.

The mobile chassis 22 includes a front portion 32 in which is the power plant (not shown) for propelling the vehicle and operating the equipment, and a rear portion 34 upon which is mounted the concrete mixer unit 30. The front portion of the mixer unit 30 is supported by an upstanding frame member 36 which is mounted on the chassis 22, and a guide hopper 40 and cooperating guide chutes 42 are provided adjacent the outlet end 44 of the mixer unit 30 for delivering a homogeneous mixture of low slump concrete to the placing apparatus 28.

The turntable structure 24 which carries the control cab 26 and the concrete placing apparatus 28 is mounted on the chassis 22 for rotational movement relative to the chassis about a substantially vertical axis. As best shown in FIGURES 6 to 8, a preferred means employed to rotatably mount the turntable structure 24 on the chassis 22 comprises a first bearing ring 46 bolted or otherwise suitably secured to the bottom portion of the turntable and a cooperating second bearing ring 48 bolted or otherwise suitably secured to the top 50 of the chassis 24. A pinion gear 52 rotatably mounted on the bottom portion of the turntable structure 24 and driven by a suitable electric or hydraulic motor 54 through a gear box 56 cooperates with gear piece 58 formed around the inner peripheral surface of the second bearing ring 48 to create relative rotational movement between the first and second bearing rings 46 and 48, and hence, between the turntable structure 24 and the chassis 22. A row of ball bearings 60 are disposed in raceways formed in the inner peripheral surface of the first bearing ring 46 and the outer peripheral surface of the second bearing ring 48 to minimize frictional drag forces.

As thus shown in FIGURES 8 to 11, the turntable structure 24 includes a forwardly extending section 62 which supports the control cab 26 and a rearwardly extending section 64 which supports the concrete placing apparatus 28. The control cab may be anchored, welded, integrally formed with, or otherwise suitably fixedly mounted on the forwardly extending section 62. The turntable structure 24 has an upper cross frame member 65 which together with section 64 defines conveyor frame opening 67. Turntable 24 further includes a rearwardly extending flange or arm 66 having a connector means 68 pivotally connected between spaced apart ears 70 on transverse member 37 on supporting frame 36 by means of a pivot pin 72 (see FIGURES 2 and 3). This pivotal connection between the turntable structure 24 and the supporting member 37 is generally coaxially aligned with the turntable structure and lends stability to the assembly.

The concrete placing apparatus 28, best shown in FIGURES 1, 2, 3, 5 and 8, includes a generally elongated belt-type conveyor, broadly designated as 74, having an inner or receiving end 76 and an outer or discharge end 78, a guide hopper 80 mounted on the discharge end 78 of the conveyor, and a discharge chute 82 rotatably and inclinedly mounted on the discharge end of the conveyor. Receiving end 76 of the conveyor extends through and is received in opening 67 between upstanding side walls 84 of rearwardly extending section 64 of turntable structure 24. The conveyor is mounted on the rearwardly extending turntable section 64 for pivotal movement about a substantially horizontal axis by means of a pivot bar 86 which extends horizontally through the receiving end 76 of the conveyor and the side walls 84 of the turntable structure. A conventional hydraulic piston and cylinder arrangement 88, 90 is provided between the conveyor 74 and cross member 65 of turntable structure 24 for selectively raising and lowering the conveyor about pivot bar 86. The piston end of the hydraulic assembly is pivotally connected to the conveyor at 92 by virtue of yoke 91 and the cylinder end is similarly pivotally connected to the turntable structure 24 and 94. Controls (not shown) for the hydraulic piston and cylinder arrangement 88, 90, like the rest of the controls for the machine, are disposed within control cab 26.

Conveyor 74 includes an upper frame section 96 and a lower frame section 98 welded or otherwise suitably connected one to the other. An endless belt 100 extends between rollers 102 and 104 at the receiving end of the conveyor 74 and a slack roller 106 at the discharge end of the conveyor. The slack roller 106 extends transversely between the side walls of the upper and lower frame sections 96 and 98 and is mounted in tension adjuster means 107 for longitudinal sliding movement. Thus, the slack roller 106 may be moved inwardly to lessen the tension on the belt 100 or outwardly to increase the tension on the belt. At least one of the receiving end rollers 102 or 104 constitutes a drive roller for controllably moving the belt to convey cement from the receiving end 76 to the discharge end 78 of the conveyor. The controls for selectively operative drive roller 102 or 104 are also disposed within control cab 26. To this end, the outer ends of shaft 108 upon which roller 106 is mounted are held in tension adjustment means 107. Flexible carrier rollers 110 for supporting belt 100 can be seen to be disposed at intervals across the conveyor frame structure. Hydraulic or electric drive means or motors may be used to power the various moving parts of the device.

A bridging member 112 extends transversely across the top spaced above discharge end 78 of the conveyor structure 74 and is attached to the side frame members thereof. An angle bar 114 is connected to a hydraulically powered rotatable drive means 111. Angle bar 114 has a generally horizontally disposed upper section 113 which extends outwardly from drive means 111 sufficiently to clear bridging member 112 and hopper 80 as it is rotated. Angle bar 114 has a depending section 115 which extends generally horizontally downwardly to roughly the lower end of hopper 80.

Connector arms 116 interconnect depending section 115 with chute 82 as at pivot attachments 117 on each side of chute 82. Drive means 111 is employed to selectively rotate the angle bar 114, and hence the discharge chute 82 moves in a generally circular path about a substantially vertical axis. A hydraulic piston 122 and cylinder 120 are pivotally connected at 118 to depending section 115. The piston and cylinder are also connected to a cross bar or yoke 124 on discharge chute 82 below the arms 116 by pivot means 123. Thus, discharge chute 82 can be inclined at various angles about a substantially horizontal axis which extends through pivot 117 and at the same time traverse the circular path mentioned above. In this way the discharge chute may be selectively located or pivoted to accurately place concrete from the conveyor 74 into any desired location. Guide hopper 80 is disposed generally above discharge chute 82 and is connected between the side walls of discharge end 78 of conveyor 74 for channeling concrete from said conveyor to said discharge chute.

FIGURES 12 and 13, while somewhat out of proportion, show that conveyor structure 74 may be such as to have a rear portion 130 and a front or outer portion 132 which is pivotable as at 134 so that the forward or front section 132 could pivot back or fold over the rear portion 130. In this way a longer conveyor structure could be incorporated on the machine. In FIGURE 13, reference also being had to FIGURE 18, conveyor 174 has a stationary rear section 140 and an outer or telescoping portion 142 for extending the conveyor when needed and for retracting it when it is not in use. In this way a tension bridle made up of rollers 144 and 146 are necessary to control belt 100 so that high tension is in the upper run of the belt and low tension applied to the bottom run. A drive mechanism as indicated in dotted lines in FIGURE 13 would have to be included in the conveyor structure in order to extend or retract the telescoping outer section 142. A conveyor belt tension bridling mechanism would also be needed in a telescoping conveyor.

FIGURE 15 shows an alternative method for rotating the turntable structure 24. In this embodiment a "Flo-Tork" unit is used in place of the ring and pinion gear arrangement described above. A pin 150 is placed in the pivotal connection between bracket or arm 66 and transverse member 37. Another shaft 151 extends from the radial and thrust bearing structure 152 to the drive unit containing motor and gears for turning the turntable and conveyor belt structure.

FIGURE 14 shows a quick coupling feature for detaching steering wheel 160 from steering gear 162. A disengaging sleeve 164 is interposed in the steering column which is in two pieces. When the transporting and placing machine has reached a job site and ready to discharge concrete, sleeve 164 can be slidably raised by lever arm 166 so that that portion of the steering column 161 which is part of the turntable structure may swing free of that part of the steering column 163 which extends into the steering gear 162. Thus, whenever the conveyor structure 74 is in non-operative position as shown in FIGURE 2 the mechanical steering column may be connected to that portion in the chassis proper. It will be appreciated that the slidable disengaging sleeve 164 shown is only one of several alternative mechanisms by which the same result can be accomplished. At all times when the mechanical steering column is disengaged control of the chassis wheels will be accomplished by hydraulically or electrically operated components.

FIGURES 16 and 17 show a boom leveling linkage mechanism which may be incorporated at the receiving end of the conveyor. Shaft 86 which provides the horizontal pivot for up and down movement of the conveyor boom structure is mounted in bearing structures 170 for rotational movement. Boom side frame members 172 have eccentric connections as at 174 so that if the machine is on sloping terrain the conveyor can be leveled. Actuation of the eccentric mechanism to either raise or lower a side of the frame is accomplished by cylinder 176 having piston 178 pivotally connected as at 180 to actuating arm 182 which is rigidly secured to shaft 86. The leveling structure of course will be part of the turntable mechanism so that leveling can be accomplished regardless of the position of the turntable and conveyor structures.

FIGURES 19 and 20 show another form of leveling system which may be incorporated with the boom structure. In this instance trunnion shafts 86 have interconnecting shaft supporting structure 184 which is pivotally mounted as at 186 on a support bracket 188 mounted on to the turntable at the receiving end of the boom structure. The primary load point is at pivot 186. Guide plates 190 are provided near each of the trunnions with guide slots 192 therein so that the pivotal motion of the trunnion support means 184 is restricted to a planer rocking motion around pivot 186. Wear shoes 194 are secured to the shaft supporting means 184 within the confines of guide slots 192. A cylinder supporting plate as shown or some other equivalent structure 196 is provided on which to mount cylinder 198 with piston 200 which in turn is pivotally connected as at 202 to a depending actuating arm 204 rigidly secured to the shaft support means 184. Thus, if it is desired to level the conveyor which is mounted on the trunnion 86 cylinder 198 is actuated either to extend or retract the piston to swing the shaft supporting means 184 around pivot 186.

It should be mentioned that the cab may be mounted on either side of the conveyor boom and conceivably could be mounted over as well as to the side. It is contemplated that additional axles both at the rear and at the forward end of the vehicle could be provided in order to increase capacity of the transporter under the highway axle loading restrictions imposed by most state laws.

In operation, the concrete transporting and placing vehicle 20 carrying a load of concrete in the concrete mixer unit 30 is driven to the location where it is desired to deliver the concrete. The controls (not shown) for driving the vehicle are located within control cab 26. Over-the-road steering may be mechanical as shown in FIGURE 14 but with quick disconnect capability. Job site steering may be hydraulic, preferred, or electrical. At the desired location the vehicle is stopped, turntable 24 is rotated and discharge end 78 of the conveyor 74 is raised until the discharge chute 82 overlies the area or form into which the concrete is to be poured. The discharge chute is then rotated by means of drive motor 111 and inclined to the desired angle by means of hydraulic piston and cylinder unit 120, 122 until the bottom of the discharge chute overlies the precise location. Since the control cab 26 which houses the controls for rotating the turntable 24, pivoting the conveyor 74 and rotating and pivoting the discharge chute 82, is mounted on the turntable 24 for concurrent rotation with conveyor 74, the operator will at all times have a maximum field of vision for maneuvering the conveyor 74 and the discharge chute 82 and for visually observing the concrete at all points as it passes from the mixer to the pour.

The concrete mixer unit 30 and the conveyor belt drive roller 102 or 104 are then actuated to deliver a homogeneous mixture of concrete through the mixer guide hopper 40 and guide chute 42 to the receiving end of the conveyor, and then to the discharge end of the conveyor and the guide hopper 80 and discharge chute 82 to the desired area. Since the control means (not shown) for driving the vehicle are also disposed within the control cab 26, the driver can move the vehicle while pouring concrete, if desired.

While the invention has been shown and described with reference to a preferred embodiment thereof, it will be understood by those skilled in the art that various changes and form and detail may be made therein without departing from the spirit and scope of the invention.

What is claimed is:
1. An improved concrete transporting, elevating and placing machine comprising:
   (a) a mobile chassis having a concrete mixer thereon;
   (b) a generally elongated concrete placing and elevating apparatus mounted on said chassis for rotational movement relative thereto about a substantially vertical axis; said concrete placing and elevating apparatus including a turntable means and a concrete conveyor structure having a receiving end and a discharge end; and
   (c) operator control housing means mounted on said concrete placing apparatus for concurrent rotational movement with said apparatus relative to said chassis.
2. The transporting, elevating and placing machine of claim 1 wherein said conveyor structure is mounted on said turntable for pivotal movement relative thereto about a substantially horizontal axis.
3. The transporting and placing machine of claim 2, wherein said conveyor structure includes a generally elongated continuous conveyor means for conveying and elevating concrete from said receiving end to said discharge end thereof.
4. The transporting, elevating and placing machine of claim 3, and further including a guide hopper mounted on said discharge end of said conveyor for receiving and guiding material discharged from said conveyor.
5. The transporting, elevating and placing machine of claim 3, and further including a discharge chute mounted on said discharge end of said conveyor for rotational movement about a substantially vertical axis and pivotal- ly inclined movement about a substantially horizontal axis relative to said conveyor.

6. The transporting, elevating and placing machine of claim 3, wherein a pivotal outer portion of said conveyor structure is hingedly secured to an inner portion thereof so that the outer portion may be folded back to overlie said inner portion.

7. The transporting, elevating and placing machine of claim 3, and wherein an outer portion of said conveyor structure is generally extendable and retractable with respect to an inner portion thereof.

8. The transporting, elevating and placing machine according to claim 3, and wherein said turntable means has a base portion which is rotatably and detachably secured to said chassis by bearing means and wherein said turntable means also has a top portion pivotally and supportably attached to frame structure on said chassis.

9. The transporting, elevating and placing machine of claim 3, wherein the receiving end of said conveyor structure is located generally below the discharge opening of said concrete mixer and the discharge end of said conveyor structure is elevatable above the level of said discharge opening.

10. A concrete transporting, elevating and placing machine, comprising:
    (a) a mobile, steerable chassis;
    (b) a concrete mixer means mounted on said chassis in such a way as to have its discharge opening facing generally towards one end of said chassis;
    (c) a support frame rotatably secured on said chassis for generally horizontal rotational movement about a generally vertically disposed axis, said support frame including an operator's cab for housing controls for said machine; and
    (d) a conveyor boom structure having a receiving end and a discharge end and including conveying means for conveying concrete from said receiving end to said discharge end, the receiving end of said boom structure and conveying means being mounted in said rotatable support frame on a generally horizontally disposed axis for raising and lowering the discharge end and swinging said boom structure and conveying means with said support frame.

11. The transporting, elevating and placing machine according to claim 10, wherein the receiving end of said boom structure and conveying means is located generally below said discharge opening of said mixer means.

12. The transporting, elevating and placing machine according to claim 10, and in which that portion of said support frame which mounts said boom structure and conveying means is located generally over said vertical axis.

13. The transporting, elevating and placing machine according to claim 12, and in which said operator's cab is located on said support frame to one side of said boom structure and conveying means for unobstructed vision of the concrete as it passes from said mixer to the point where it is placed.

14. A concrete transporting, elevating and placing machine, comprising:
    (a) a mobile chassis having forward and rear ends;
    (b) a mixer means mounted on said chassis in such a way as to have its discharge opening facing generally towards the forward end of said chassis;
    (c) a generally elongated swingable boom frame structure having an inner end positioned generally below said discharge opening and including a continuous type conveyor means thereon, said boom structure being pivotable at its inner end about a substantially vertical axis for swinging said boom structure and conveyor from side to side of said machine and also pivotable about a horizontal axis for raising and lowering the outer end of said boom structure and conveyor; and
    (d) an operator control housing means secured to said boom frame structure for swinging movement therewith but further secured so as to permit raising and lowering of the boom structure relative to said housing means.

15. The transporting, elevating and placing machine of claim 14, wherein a pivotal outer portion of said conveyor structure is hingedly secured to an inner portion thereof so that the outer portion may be folded back to overlie said inner portion.

16. The transporting, elevating and placing machine of claim 14, and wherein an outer portion of said conveyor structure is generally extendable and retractable with respect to an inner portion thereof.

17. The transporting, elevating and placing machine according to claim 14, and wherein said boom structure has a base portion which is rotatably and detachably secured to said chassis by bearing means and wherein said boom structure means also has a top portion pivotally and supportably attached to frame structure on said chassis.

18. A concrete transporting, elevating and placing machine, comprising:
    (a) mobile chassis having forward and rear ends;
    (b) a concrete mixer means mounted on said chassis in such a way as to have its discharge opening facing generally towards the forward end of said chassis;
    (c) support frame rotatably mounted on said chassis for swinging movement about a generally vertically disposed axis, said support frame including a turntable section located generally below said mixer discharge opening and an operator's control housing cab section located forwardly and to one side of said turntable section;
    (d) a conveyor boom structure having a receiving end and a discharge end and including conveyor means for transferring concrete from said receiving to said discharge end, the receiving end of said boom structure being pivotally mounted on the turntable section of said support frame about a generally horizontally disposed axis; and
    (e) power means interconnecting said support frame and said boom structure for raising and lowering the discharge end of said boom structure.

19. The transporting, elevating and placing machine according to claim 18, wherein a pivotal outer portion of said conveyor structure is hingedly secured to an inner portion thereof so that the outer portion may be folded back to overlie said inner portion.

20. The transporting, elevating and placing machine according to claim 18, and wherein an outer portion of said conveyor structure is generally extendable and retractable with respect to an inner portion thereof.

21. The transporting, elevating and placing machine according to claim 18, and wherein said support frame has a base portion which is rotatably and detachably secured to said chassis by bearing means and wherein said support frame also has a top portion pivotally and supportably attached to frame structure on said chassis.

22. The transporting, elevating and placing machine according to claim 18, wherein the receiving end of said conveyor structure is located generally below the discharge opening of said concrete mixer and the discharge end of said conveyor structure is elevatable above the level of said discharge opening.

23. A movable chute means for the outer end of a conveyor having support structure thereon, comprising:
    (a) a controllable pivotal main support arm attached to said support structure, said main arm having a generally downwardly extending main support section with secondary arm means extending outwardly therefrom;
    (b) said chute means being pivotally attached to said secondary arm means so as to pivot about a generally horizontal axis; and (c) power means interconnecting said chute means and said main support arm for pivoting said chute means about said horizontal axis to vary the angle of incline thereof, said rotatable main support arm also permitting said chute to be rotated through a generally circular path.

24. The movable chute means according to claim 23 and in which said main support arm pivots about a generally vertically disposed axis.

25. The movable chute means of claim 23 and wherein said pivotal main support arm is controlled by power means also located on said support structure.

References Cited

UNITED STATES PATENTS

| | | | |
|---|---|---|---|
| 2,705,134 | 3/1955 | Jerner | 259—172 |
| 2,859,949 | 11/1958 | Willard | 259—161 |
| 3,019,002 | 1/1962 | Prichard | 259—161 X |
| 3,185,450 | 5/1965 | Duecy | 259—172 |

ROBERT W. JENKINS, *Primary Examiner.*